United States Patent [19]

Matthews

[11] Patent Number: 5,793,859
[45] Date of Patent: Aug. 11, 1998

[54] ADAPTIVE TELEPHONE NUMBER SELECTION METHOD AND SYSTEM

[75] Inventor: Gordon H. Matthews, Austin, Tex.

[73] Assignee: Matthews Communications Management, Inc., Austin, Tex.

[21] Appl. No.: 439,299

[22] Filed: May 11, 1995

[51] Int. Cl.[6] .................................................. H04M 7/00
[52] U.S. Cl. .......................... 379/220; 455/417; 455/455
[58] Field of Search .................................. 379/57, 58, 59, 379/60, 61, 62, 63, 67, 88, 211, 229, 220; 455/33.1, 33.2, 417, 455

[56] References Cited

U.S. PATENT DOCUMENTS

| | | | |
|---|---|---|---|
| 5,276,731 | 1/1994 | Arbel et al. | 379/88 |
| 5,375,161 | 12/1994 | Fuller et al. | 379/57 |
| 5,392,342 | 2/1995 | Rosenthal | 379/211 |
| 5,430,791 | 7/1995 | Feit et al. | 379/67 |
| 5,473,681 | 12/1995 | Partridge, III | 379/229 |

OTHER PUBLICATIONS

Cellularone, "Fine Me Now" The Smart Phone Number that Follows You Wherever You Go, Apr. 1994.

*Primary Examiner*—Curtis Kuntz
*Assistant Examiner*—Binh K. Tieu
*Attorney, Agent, or Firm*—Baker & Botts, L.L.P.

[57] ABSTRACT

A method and system for directing a telephone call to an intended call recipient. The method and system may be used to place both inbound calls to and outbound calls from a user. The method and system includes the steps and functions of generating a call signal associated with the intended call recipient. The call signal is translated to an identifier for a set of telephone numbers, such as a telephone number selection matrix, associated with the intended call recipient. At least one telephone number is then selected to call from the set of telephone numbers according to a plurality of continually changing parameters. The system then places a telephone call using the selected telephone number. The success of the telephone call is determined according to at least one predetermined criterion. In the event of an unsuccessful call, the system then selects at least one previously unselected telephone number from the set of telephone numbers and repeats the above steps until the first occurrence of either a successful telephone call or the condition that the set of telephone numbers contains no previously unselected telephone numbers. The previous successes in using a given telephone number determine its likelihood of being used in subsequent calls when the continuously changing parameters have similar values.

39 Claims, 4 Drawing Sheets

| | TIME SPAN INCREMENTS | | | |
|---|---|---|---|---|
| POSSIBLE NUMBERS | 8:00 AM 18 | 9:00 AM 20 | 10:00 AM | ETC. |
| HOME 555-1111 | 4 | | | |
| OFFICE 555-2222 | | 5 | 5 | |
| CELLULAR 1 555-3333 | | 6 | | |
| CELLULAR 2 555-4444 | | | | |
| CLUB 555-6666 | | | | |
| WORKSHOP 555-7777 | | | | |

*FIG. 1*

| | TIME SPAN INCREMENTS | | | |
|---|---|---|---|---|
| POSSIBLE NUMBERS | 8:00 AM 32 | 9:00 AM | 10:00 AM | ETC. |
| HOME 555-1111 | N | | | |
| OFFICE 555-2222 | | 5 | 5 | |
| CELLULAR 1 555-3333 | 1 | 6 | | |
| CELLULAR 2 555-4444 | | | | |
| CLUB 555-6666 | | | | |
| WORKSHOP 555-7777 | | | | |

ADAPTIVE TELEPHONE NUMBER SELECTION METHOD AND SYSTEM

TECHNICAL FIELD OF THE INVENTION

This invention relates generally to telecommunications systems, and more particularly to an electronic signal processing method and system for an adaptive telephone number selection having the ability to automatically locate and call an intended call recipient as a function of previously successful calling attempts.

BACKGROUND OF THE INVENTION

With today's telecommunications systems, there are many ways to reach an intended call recipient. For example, a called person may have (a) at least one office telephone number, (b) a voice mail box number, which may be different from the office telephone number, (c) at least one home or vacation home telephone number, (d) a members' telephone number at an athletic or country club, (e) a telephone number for a digital pager system, and (f) at least one telephone number for a cellular phone that the person carries or keeps in an automobile. When traveling, the person may also have a telephone number associated with his hotel room or office at the out-of-town location.

With the frequency and rate at which people now travel to conduct business, it is often the case that a single attempt to locate an intended call recipient will be unsuccessful. The intended call recipient may be at a multitude of places, depending on the time of day and day of the week, with each place having a separate telephone number. Today, a caller may keep a personal telephone book with many different numbers for a friend or associate, for example. When the caller desires to call the friend or associate, the caller must decide which one telephone number to call from all of the possible telephone numbers as the most probable number to dial to reach the friend or associate. For instance, during the morning or afternoon of a week day, the best number to dial may be the office telephone number. During the evening on any day, the best number to dial may be the home telephone number.

The problem of which number to dial to reach a person becomes more complicated with the ever increasing telephone numbers that can reach a given call recipient. Therefore, there is a need for a way to reduce this complexity in selecting the telephone number as the best possible number to dial to reach an intended call recipient.

There is a need for an effective and efficient way for making inbound calls to an intended call recipient when the recipient has many possible telephone numbers.

There is also a need for a method and system to assist a caller to make an outbound call when the intended call recipient has many potential numbers to use.

SUMMARY OF THE INVENTION

In accordance with the present invention, therefore, a method and system for assisting a caller to select a telephone number for reaching an intended call recipient is provided that substantially eliminates or reduces disadvantages and problems associated with previously developed methods and systems for telephone number selection.

More specifically, the present invention provides a method and a system for selecting a telephone number and directing a telephone call to an intended call recipient that includes the steps of generating a call signal associated with the intended call recipient. The method includes the steps of translating the call signal to an identifier for predetermined set of telephone numbers associated with the intended call recipient. The step of selecting a most probable telephone number to call from the predetermined set of telephone numbers according to a plurality of continually changing parameters is a next step in the method. The method includes the step of placing a telephone call using the selected telephone number. In placing the call, the method determines the success of the telephone call attempt according to predetermined criteria. In the event of each of the telephone calls generating an unsuccessful call, the method further includes the step of selecting at least one previously unselected telephone number from the predetermined set of telephone numbers. These steps are repeated until the first occurrence of either a successful telephone call or the condition that the predetermined set of telephone numbers contains no previously unselected telephone numbers.

Another aspect of the present invention is an apparatus for using the past history of successful and unsuccessful numbers dialed to reach the intended call recipient. When a telephone number is selected by the system and placed, the caller may indicate by touch tone or voice command that the number selected was unsuccessful, and that the next most probable number is to be selected. If that number is unsuccessful, then the caller may keep commanding the system to select the next most successful number for placement until either the intended call recipient is reached or there are no more numbers to try.

A technical advantage of the present invention is that it not only selects a most probable telephone number to use in reacting the intended call recipient, but it also provides the caller with the optional ability to record a voice message asking if the person to be called is available. The voice message might say, "This is John Smith, is Joseph Doe available?" This message could be placed after each number is dialed and answered. When the person answering the call responds with a negative reply, the call is determined to be unsuccessful and the next most probable number, if there is one, is called. If the intended call recipient responds positively, then the caller is notified and connected to the called number. If the system of the present invention has tried all applicable numbers and all were unsuccessful, then it will notify the caller of the failed attempts.

Another technical advantage that the present invention provides is the ability to note certain numbers as special types of numbers associated with voice mail systems, voice or digital pagers, facsimile machines and other automated call answering systems. Different procedures are required for these special numbers. For instance, a voice or digital pager access could result in a stream of numbers or a combination of voice and digital numbers being sent to indicate a number to be dialed or a code indicating a caller identification number. The system and method of the present embodiment work well to accommodate this necessary degree of flexibility.

BRIEF DESCRIPTION OF THE DRAWINGS

For a more complete understanding of the present invention and the advantages thereof, reference is now made to the following description which is to be taken in conjunction with the accompanying drawings in which like reference numerals indicate like features and wherein.

3

DETAILED DESCRIPTION OF THE INVENTION

The preferred embodiment of the present invention and its advantages are best understood by referring to FIGS. 1 through 7 of the drawings, like numerals being used for like and corresponding parts of the various drawings.

Figure 5:
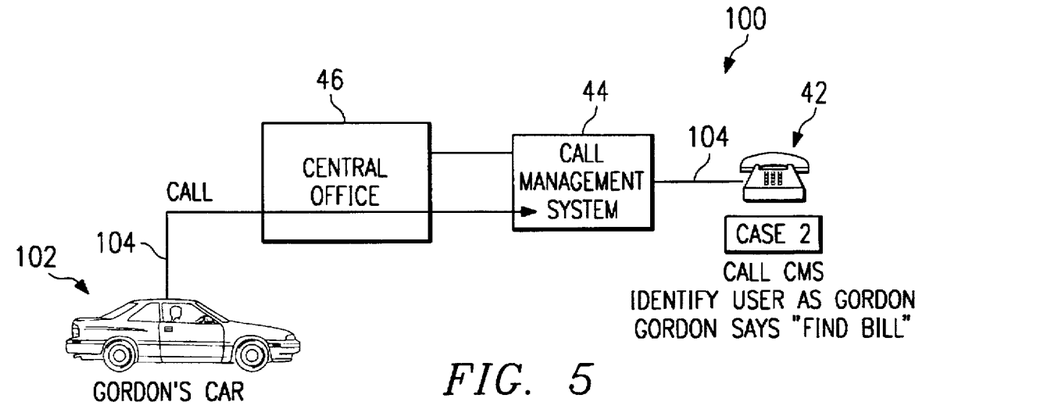
FIG. 5 provides another application diagram of another embodiment of the invention.
Figure 6:
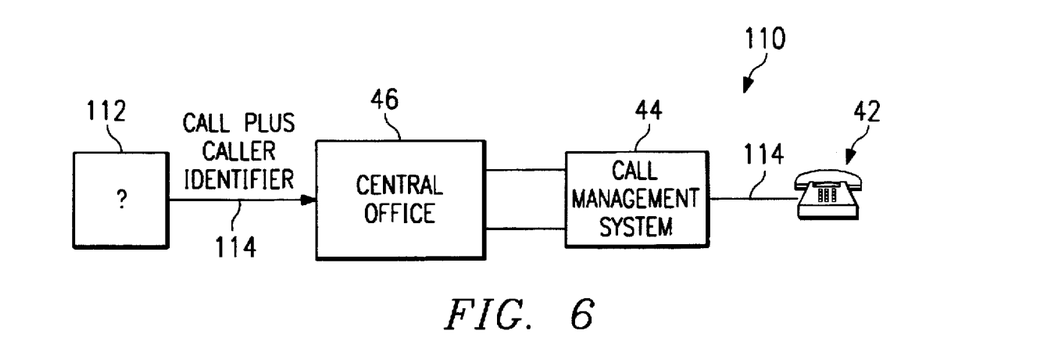
FIG. 6 illustrates an application diagram of another embodiment of the invention.
Figure 7:
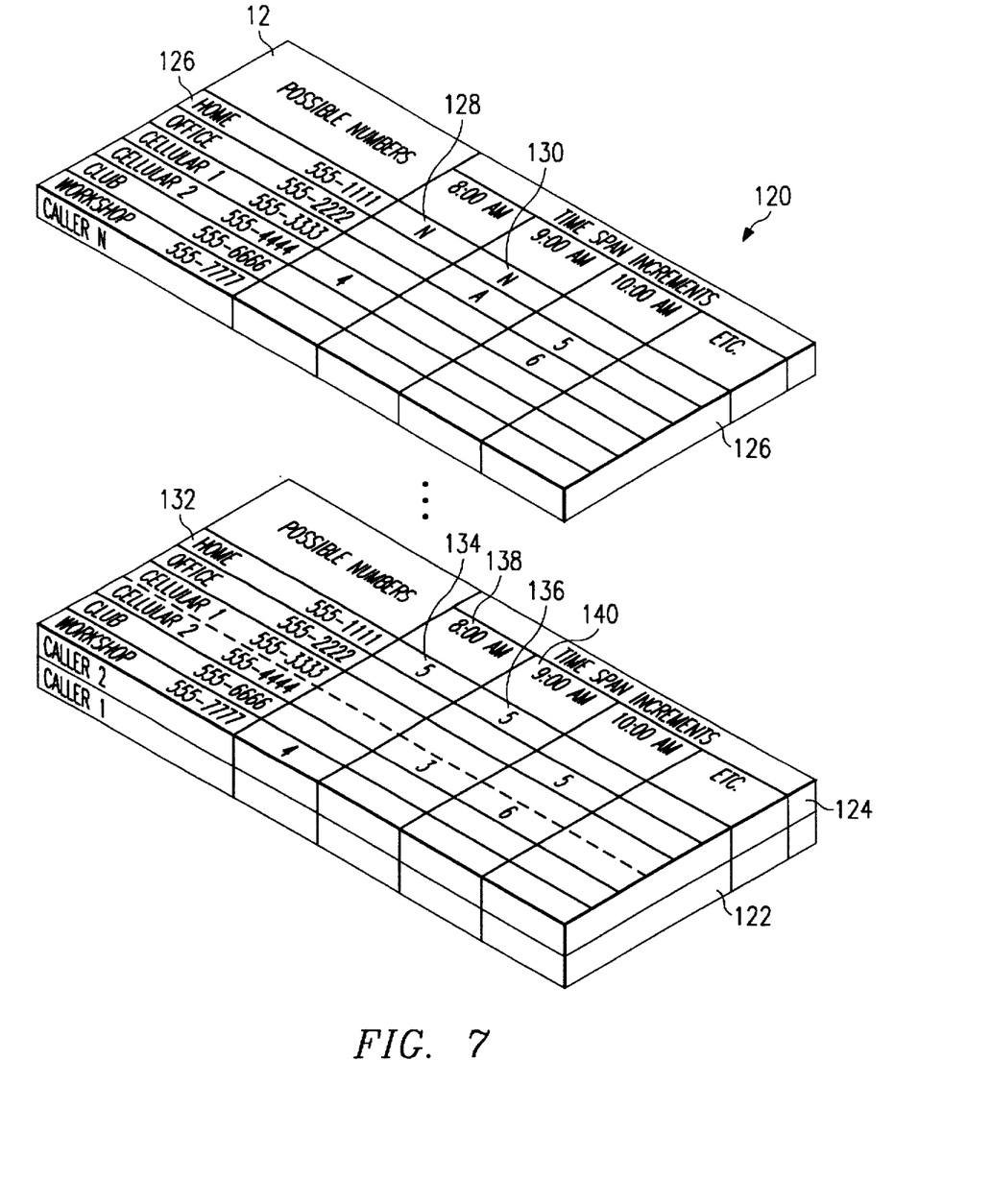
FIG. 7 shows a set of telephone number selection matrices applicable to the FIG. 6 embodiment of the invention.

The present invention has application for both "outbound" and "inbound" calls. An outbound call occurs when the caller uses a system including the concepts of the present invention while the intended call recipient may not own or control such a system. An inbound call is one in which the intended call recipient owns or controls a call management system 44 equipped with the present embodiment of the invention, while the caller may not control or own a system equipped with the present invention. For the outbound call, the caller would use the features and functions of the present embodiment as described in FIGS. 1 through 4 below. FIGS. 5 through 7 below describe the functions and operations of the present invention during an inbound call. In the event that both the caller and the intended call recipient own or control the present telephone number selection system, functions described in FIGS. 1 through 7 occur as necessary to achieve the objectives of the present invention herein described.

Furthermore, although the following description relates to use of a telephone in conjunction with the present method and system, the present invention has broad application to cellular telephones and other devices for communication, including for example, a personal communication service (PCS). The present invention has application with this type of system to improve the efficiency and effectiveness of locating and completing a call to an intended call recipient.

Figure 1:
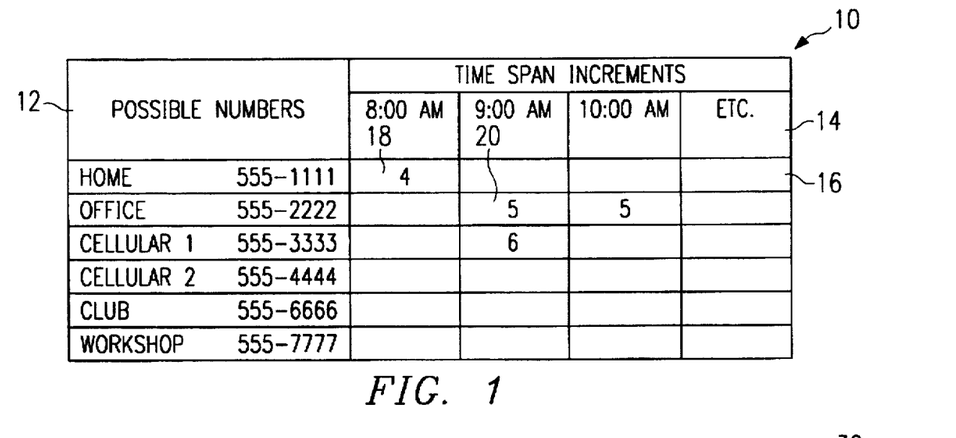
FIG. 1 illustrates a possible number selection matrix according to the present invention.

FIG. 1 illustrates telephone number selection matrix 10 that includes possible numbers column 12 and time span increments columns 14. Possible numbers column 12 includes telephone numbers for reaching an intended call recipient. These telephone numbers may be input directly by the owner of the present invention as an initial predetermined set of telephone numbers for reaching him. Thereafter, the present invention continually updates the set of telephone numbers as a function of successful calls to the intended call recipient. Time span increments columns 14 of number selection matrix 10 associate with a given time increment such as each hour beginning at, in this example, 8:00 AM and continuing through to a predetermined time, such as 10:00 PM, for example. Numbers within each success cell 16 of time span increments 14 indicate the number of times that the intended call recipient has been reached at a particular number during a particular time span. For example, the numeral "4" in cell 18 indicates that at home number "555-1111" during the time span beginning at 8:00 AM and ending at 9:00 AM the intended call recipient was successfully called four times. Likewise, in cell 20 the numeral "5" indicates that at office number "555-2222" the intended call recipient was successfully called five times during the time span beginning at 9:00 AM and ending at 10:00 AM.

4

To understand the operation of the system with number selection matrix 10, suppose an example in which a caller using the system of the present invention, intends that person, "Joe" receive a call from the caller. Joe's data base may merely contain all of the possible numbers to be used in calling him. In FIG. 1, possible number column 12 indicates possible telephone numbers to be used to reach Joe. Time span increment columns 14 contain success cells 16 that correspond with telephone numbers in possible numbers column 12 for reaching Joe. Each success cell 16, therefore, indicates the number of times that Joe has previously been reached at the given time span increment and telephone number.

When the caller wishes to call Joe, the caller may access the system of the present embodiment to issue a command to call Joe. This command may be initiated via voice, keyboard, or telephone touch tone keypad buttons. A voice command may be converted from the voice command, "call Joe," to a call signal using one of many known types of voice recognition schemes for translating the voice command to an electronic signal corresponding to "Joe" in this instance.

Other electronic ways of generating the call signal may include highlighting a representative icon or symbol for the person or a picture of the person's face on a computer screen. Using a telephone keypad, a caller may be instructed through a voice menu to press a touch tone key for generating the call signal. There are, obviously, many different ways to generate the call signal for initiating the call. All possible ways of generating the call signal are, therefore, within the scope of the present invention.

Figure 2:
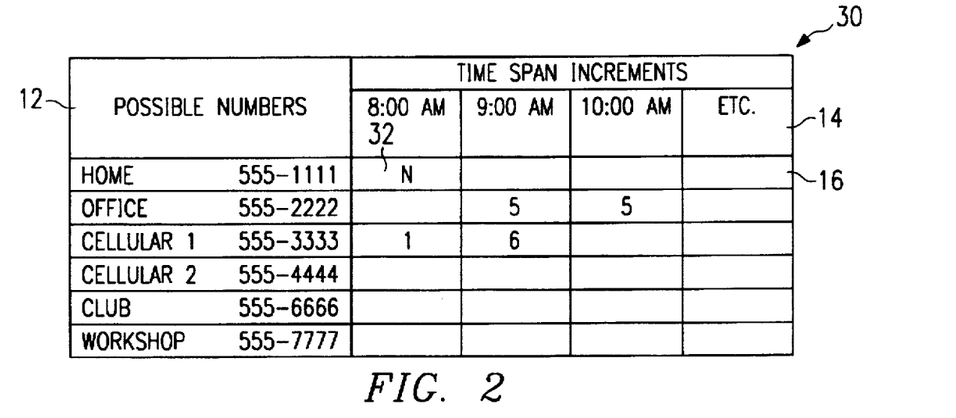
FIG. 2 shows an alternative number selection matrix according to the present invention.

Prior to explaining in yet further detail the functioning of the present embodiment, this discussion introduces an important user selectable feature. For this reason, FIG. 2 illustrates an alternative embodiment telephone number selection matrix 30 that, in most respects, is essentially similar to telephone number selection matrix 10 of FIG. 1, including possible number column 12, time span increments columns 14, and call success cell 16. A difference between telephone number selection matrix 30 in FIG. 2 and telephone number selection matrix 10 of FIG. 1 is call success cell 32, which includes the letter "N". The N entry of call success cell 32 indicates that during the time span increment between 8:00 AM and 9:00 AM, the intended call recipient has selected not to be available at home number "555-1111". This feature has the benefit of preventing the home number from being used as an automatically selected number.

Figure 3:
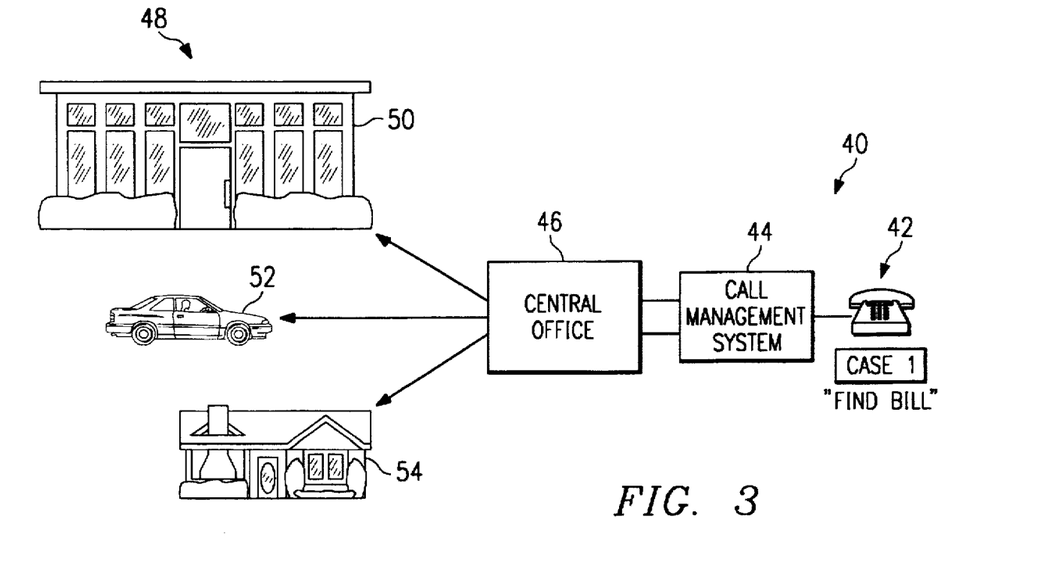
FIG. 3 depicts one application of the present embodiment of the invention.

Having introduced some concepts of the present invention, it is now appropriate to show operation of the method and system using an illustrative example. FIG. 3, therefore, illustrates process flow diagram 40 to indicate operation of one embodiment of the present invention. Suppose a caller decides to call a person named "Bill" as the intended call recipient. To this end, the caller uses telephone 42 to generate the voice command "Find Bill." This voice command generates a call signal that goes to call management system 44.

Call management system 44 may be in the form of an adapter card that is part of a personal computer that connects to telephone 42. On the other hand, call management system 42 may be a stand-alone system or may even be part of a larger network of associated computers and terminals that assist in controlling and managing telecommunications functions of a large facility or institution. For purposes of the present invention and irrespective of the supporting electronic processing system, call management system 44 translates the call signal from telephone 42 to an identifier for a predetermined set of telephone numbers, e.g., telephone number selection matrix 10 or 30, that are associated with Bill, the intended call recipient. From the predetermined set of telephone numbers, call management system 44 of the present embodiment selects a telephone number to call Bill using a telephone number selection matrix such as telephone number selection matrix 10 of FIG. 1 or telephone number selection matrix 30 of FIG. 2.

In response to this number receiving this telephone call, central office 46 directs a call to a telephone at one of the possible locations for the intended call recipient such as possible locations 48, which may include, for example, the recipient's office 50, the recipient's cellular phone in the recipient's automobile 52, or the intended call recipient's home 54. The success of a call to one of the possible locations 48 in FIG. 3 and actions of the present embodiment in response to such success are described in more detail in FIG. 4.

Figure 4:
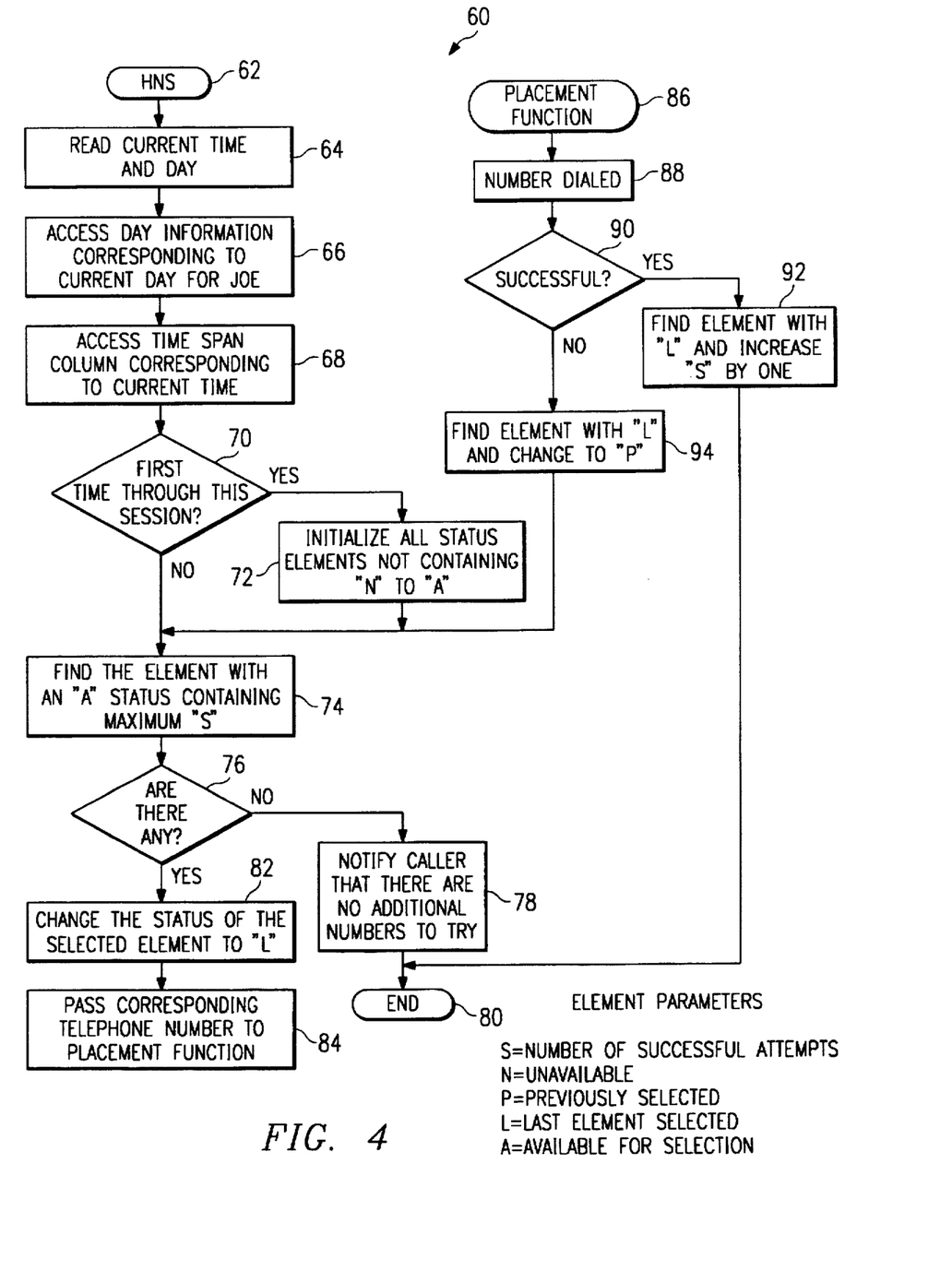
FIG. 4 is a flow diagram describing operation of the present embodiment.

FIG. 4 shows flow diagram 60 to indicate one application of the method and system of the present embodiment. According to FIG. 4, a caller may engage the telephone number selection system of the present embodiment using any one of a variety of ways to generate a call signal and start the present method, as start step 62 indicates. The next step that the system of the present embodiment performs is to read the current time and day, as step 64 depicts. At step 66, day information corresponding to the current day for the intended call recipient is provided to the system. Block 66 indicates the next step of accessing a time span increment column 14 of a telephone number selection matrix 10 that corresponds to the current time and day provided in step 64. The next step of the present embodiment occurs at query 70 at which a test occurs of whether this is the first time through number selection process 60 for an attempted call. If the answer to query 70 is "YES," the next step appears at step 72 at which point the present embodiment tags all success cells 16 not containing an "N" with an "A" designation. This initializes all success cells 16 of the respective telephone number selection matrix 10. In this step, the "N" designation indicates that a particular number is unavailable at a particular day and particular time, such as appears in success cell 32 of telephone number selection matrix 30 in FIG. 2. The "A" designation indicates that a success cell 16 is available for selection.

If the answer to query 70 is "NO," then process flow proceeds to step 74 where flow diagram 60 shows the step of finding the element of the applicable telephone number selection matrix 10 with an "A" status containing a maximum "S" number. "S" indicates the number of successful attempts associated with a particular number in the given time span for the given day. The next step of the present embodiment occurs at query 76 where a test occurs of whether there are any success cells 16 within the tested telephone number selection matrix 10 (or 30) that still contains an "A" status.

If the answer to query 76 is "NO," process flow goes to step 78 at which point the telephone number selection system of the present embodiment notifies the caller that are no additional numbers to call. Thereafter, process flow goes to step 80 to end telephone number selection process flow 60. If the answer to query 76 is "YES," process flow goes to step 82 at which point the status of the selected success cell 16 of telephone number matrix is changed from "A" to "L," where "L" represents the last element selected. Then, at step 84, process flow 60 passes a corresponding telephone number to telephone call placement function 86.

Placement function 86 takes process flow 60 to step 88 for calling the telephone number that was selected by step 74 is called. The telephone number called is the number of the telephone that will most likely reach the intended call recipient. Query 90 tests whether the call was successful in reaching the intended call recipient. If so, process flow proceeds to step 92 at which point the success cell 16 of telephone number selection matrix 10 that contains the element "L" is increased by the value 1. Then, process flow proceeds to end step 80 for terminating the telephone number selection process. If the system of the present invention has tried all applicable numbers and all were unsuccessful, then it will notify the caller of the failed attempt.

In the event that the result of query 90 is negative, process flow 60 proceeds to step 94 at which point the success cell 16 of telephone number selection matrix 10 containing the last called telephone number is located and a designator, "P", is entered into that success cell 16. The "P" designates that the success cell 16 is a previously selected success cell. Then, process flow proceeds to step 74. At step 74, process 60 attempts to find the element still having an "A" status that contains the maximum "S." In the event of a tie between two or more success cells 16, an arbitrary selection technique or a criterion-based selection technique may be used to derive a single success cell 16, if desired. Thereafter, process flow 60 continues as previously described.

Note that the above description uses a single line in calling the intended call recipient. The present invention, however, clearly contemplates the use of more than one line to locate the intended call recipient. As such, the method would call, for example, several probable telephone numbers in parallel and essentially simultaneously uses several telephone lines. Once a successful call occurs, the parallel calling could terminate.

Because of the preceding explanation of the steps and functions of the present embodiment, it is now understood how the method and system direct a telephone call to an intended call recipient. An example of system operation will now refer to FIGS. 1 through 4. Once the caller generates a call signal, "Find Bill," associated with the intended call recipient, "BILL" at step 62, the present embodiment translates the call signal to an identifier for a predetermined set of telephone numbers using call management system 44. The predetermined set of telephone numbers for the present embodiment takes the form of telephone number matrix 10 that associates with the name, "Bill." The embodiments steps and functions next include selecting at least one telephone number from the telephone number matrix 10 to call from the telephone number selection matrix 10 according to a plurality of continually changing parameters such as those occurring at steps 72, 74, 78, 82, and 84. Suppose then, that the caller places the call at 8:30 AM and that telephone number selection matrix 10 of FIG. 1 is Bill's matrix. Then, call management system 44 using process flow 60 will call Bill at his home number, 555-1111. This is the step of placing at least one telephone call using the selected telephone number to call, according to step 86. At step 90, the embodiment determines the success of the telephone call according to at least one predetermined criterion. Thus, if Bill answers his home telephone, process flow 60 may determine this to be a success. The success performance of a call, i.e., satisfying the predetermined criterion may be used to terminate the telephone number selection process flow.

Although there are numerous ways to indicate a successful call with the present invention, some preferable ones may be that (1) an answered call exceeds a present direction (e.g., greater than 2.5 minutes); and/or (2) the caller responds by voice or keystroke to a query of whether the caller desires call management system 44 to place another call; and/or (3) the caller fails to respond by voice and/or keystroke to a query of whether the caller desires call management system 44 to place another call. The ways in which the present invention indicate a successful call could also vary according to whether the system places only one call at a time or essentially simultaneously places numerous calls in locating the intended call recipient.

On the other hand, if the call is not successful, i.e., Bill does not answer the home telephone, the present embodiment of selects at least one available telephone number from the predetermined set of telephone numbers according to steps 94, 74, 82, and 84. These telephone number selection steps are repeated until the first occurrence of either a successful telephone call or the condition that the predetermined set of telephone numbers contains no previously unselected telephone numbers. That is, referring again to FIG. 1, process flow 60 would then call office telephone number, 555-2222, then cellular 1 telephone number, 555-3333, etc., all depending on the value and availability of the associated success cell 16.

In one embodiment of the invention, therefore, call signal generating step 62 may include the step of generating a voice command associated with the intended call recipient. Call signal generating step 62, on the other hand, may include the step of generating a keystroke command associated with the intended call recipient using, for example, a computer keyboard, a telephone keypad, or mouse-type device. With a mouse-type device, an associated display program on a computer screen may permit highlighting the intended call recipient's name in a list of possible names to call. The caller may then simply "click" the mouse-type device to generate the call signal.

Telephone number selecting step 74 may select the telephone number to call as a most likely number at which to reach the intended call recipient according to the continually changing parameters. Available telephone number selecting step 74 may include, therefore, the step of selecting the previously unselected telephone number as a next most likely number at which to reach the intended call recipient. The call signal translating functions that steps 62, 64, 66, and 68 perform may include translating the call signal to an identifier for the telephone number selection matrix 10, according to a continually changing parameter associated with the day of the week on which the translating step occurs.

Call placing step 86 may further include the step of essentially simultaneously placing a plurality of telephone calls using the plurality of telephone numbers to call from the predetermined set of telephone numbers. This type of calling, which may be labeled "turbo" calling, provides the immediate result of even more effectively and expeditiously locating the intended call recipient. Success determining step 90 may further include the step of determining that the duration of the call exceeds a predetermined time limit or, perhaps, the occurrence of a successful call response signal that the caller may provide upon being queried by the call management system.

An important aspect of the present embodiment is that it automatically revises telephone number selection matrix 10 as unsuccessful and successful calls occur. For example, in step 92, a successful call is recorded in an associated telephone number selection matrix for the intended call recipient. The date and time span for each successful and unsuccessful call is then used as historical information by the system of the present embodiment for reaching the intended call recipient the next time. Thus, if another call to the intended call recipient occurs in the same time span for the same day, the system of the present embodiment uses this information in steps 64, 66, and 68 to place the call to the telephone number having the greatest likelihood of reaching the intended recipient.

Another important aspect of the method and system of the present embodiment is that it "learns" the most likely number for reaching the intended call recipient as a result of previously attempted calls. The present invention, therefore, provides a heuristic or problem-solving technique of learning through discoveries that results in a most appropriate telephone number to call from the numerous telephone numbers that appear in telephone number selection matrix 10.

The use and configuration of telephone number selection matrices 10 in the various embodiments of the invention is highly flexible. One embodiment of the present invention may, for example, to include three different telephone number selection matrices 10 for each intended call recipient. Also, as discussed in greater detail below, different callers or classes of callers may be assigned to different telephone number selection matrices 10 for a given caller making an inbound call to a given owner of the system. One telephone number selection matrix 10 may relate to the weekdays, Monday through Friday, another may cover Saturday, another Sunday. With this configuration, each following business day the weekday telephone number selection matrix 10 will learn from the successful and unsuccessful calls of the previous day. Likewise, each following Saturday's telephone number selection matrix 10 will benefit from the successful and unsuccessful call attempts of the previous Saturday. The same will be true for the Sunday telephone number selection matrix.

For a given telephone number selection matrix 10, the duration of a time span increment may also vary. For example, it may be beneficial to have the time span increment duration be more than or less than the one hour time span increment 14 that FIGS. 1 and 2 show. These could change according to the successful calls that occur during a given time span increment. It may be, for example, the case that a 30-minute time span increment works best during the morning when a person is dressing and traveling to work. During the day, a one-hour time span increment duration may be optimal. Later in the day, a two-hour time span increment may be best. During a person's regular sleeping hours, a four- or eight-hour time span increment duration could provide an acceptable level of performance. An important point to consider with all of these variations, however, is that the system of the present embodiment learns and adapts to the intended call recipient or owner's lifestyle according to the record of successful calls to him or her.

The system of the present embodiment may also operate on a different cycle than a seven-day week cycle. For example, on a regular monthly basis an intended call recipient may leave his home town (e.g., to drill as a military reservist out of town). The system of the present embodiment includes the ability to automatically adjust the operation cycle, taking into consideration this regular deviation from a weekly pattern to select the out-of-town location as the most likely location at which to reach the intended all recipient. Other programming options may be selected by the intended call recipient and are well within the scope of the present invention.

Although the present system may be employed with separate circuitry and instructions to support the methods and functions, a personal computer may also be used to apply the concepts of the present invention. Thus, a caller may perform the call directing method using an independent personal computer for receiving a single call signal and directing the telephone call in response to the single call signal. In addition, the call directing method may be employed using a multi-user computer network for receiving a plurality of call signals and directing the telephone call in response to at least one of the plurality of call signals. In a multi-user network, the method may further include the steps of using a multi-user computer network associated with a memory device for storing the telephone number selection matrix 10 and revising telephone number according to the results of the steps and functions of process flow diagram 60 of FIG. 4.

The present embodiment may also provide the ability for the caller to record a voice message asking if the person to be called is available. This message could be placed after each number is dialed and answered. When the person answering the call responds with a negative reply, the call is determined to be unsuccessful and the next most probable number, if there is one, is then called. If the intended call recipient responds positively, then the caller is notified and connected to the called number.

The present invention may also provide the ability to note certain numbers as special types of numbers associated with voice mail, digital voice or digital pagers, and other telecommunications devices. Different procedures could be used in the event that one of possible numbers in column 12 of telephone number selection matrix 10, for example, is such a number. For instance, a pager access could result in a stream of numbers being sent indicating a number to be dialed or a code indicating a caller identification number.

Note that the above description is for placing a single call to a single call recipient. The present invention is not so limited, however. Using the present embodiment, it is practical to call many intended call recipients to place, for example, a conference call. A telephone number selection matrix 10 could be accessed for each intended call recipient. The system could create a report file in an associated computer memory indicating the success of reaching each caller. The caller could cycle through the list until all persons are called or until the caller leaves a message for each caller. Moreover, an associated system could provide a written report of those individuals for whom no contact occurred.

FIGS. 5, 6 and 7 depict alternative embodiments of the present invention. Referring to FIG. 5, there appears system operational flow 100 for an inbound call to be made by a caller 102 whose name is "Gordon." In this embodiment, the telephone number selection method and system will not operate to find the intended call recipient, in this case "Bill," unless Gordon is first authorized by Bill to have access to this location function. Assuming that Gordon has been so authorized, the call process continues. Line 104, therefore, indicates the call from Gordon going to central office 46 and passing to call management system 44. Based on the telephone number selection process of the present embodiment and after verifying Gordon's identity, call management system 44 activates the telephone numbering system for identifying the location or telephone number of the intended call recipient, Bill, whose name has at least one telephone number selection matrix 10 according to the already-described embodiments. The telephone number selection system determines the most likely number for reaching the intended call recipient, Bill, and places call 104 to the appropriate telephone 42 at which Bill can be located.

FIGS. 6 and 7 take the concepts of FIG. 5 a step further to illustrate how the system of this alternative embodiment may work to complete an inbound call depending upon the identity of the caller. FIG. 6 shows process flow 110 in which an unknown caller 112 makes a call for an intended call recipient having a system according to the present embodiment. In a telephone system having a caller identification function, call 114, including the associated caller identifier goes to central office 46. The code or key for identifying the caller may be that provided by the ANI (automatic number identification) format, the well-known caller ID technique, or some other known technique for identifying the inbound call's telephone number or caller. Central office 46 directs the inbound call to call management system 44. Depending on the call identifier, the call 114 will go from call management system 44 to telephone 42 to reach the intended call recipient.

FIG. 7 shows how this feature with respect to numerous callers and a given intended call recipient. Suppose that a matrix exists for each of callers 1 through K who desire to call a person who uses the system of the present embodiment. In the alternative embodiment, FIG. 7 shows telephone number selection matrix stack 120 that includes numerous telephone number matrices for possible callers to the intended call recipient. For example, caller 1 may have telephone number selection matrix 122 that the system of the present embodiment activates in response to caller 1's call identifier. Likewise, telephone number selection matrix 124 activates in response to call management system 44 receiving a call with the associated call identifier for caller 2. The individual telephone number selection matrices may be established for any reasonably arbitrary number K of callers, depending on system capacity. As a further example, telephone number selection matrix 126 may be assigned to any caller for whom a telephone number matrix is not held within the memory of call management system 44. A benefit of this construction is apparent when the "N" facility for making a telephone number not available during a specific time span increment, as FIG. 2 describes, is further considered.

Suppose, for example, that a caller K or a caller for which no pre-existing telephone number matrix exists calls in the fashion that FIG. 6 describes. If the caller makes the call between 8:00 AM and 10:00 AM in the morning on a day on which it is more likely than not that the intended call recipient is at the home telephone number "555-1111," caller "K" will not have access to the intended call recipient's home telephone. This is because the corresponding cells 130 and 132 of telephone number matrix 126 have a user-specified "N" in each cell. Thus, in this example, although it is more likely than not that call management system 44 would direct a call to the intended call recipient at his home, the N values in cells 130 and 132 prevent the unauthorized caller K from reaching the intended call recipient at the home number. Instead, the system may direct the call to the intended call recipient's office, cellular phones, club, or workshop. The caller K may then leave a message for the intended call recipient to call him back or caller K may be directed to the intended call recipient's voice or digital pager to leave a telephone number. Then, the call recipient could immediately call back the called person.

On the other hand, caller 2 is authorized to call at the intended call recipient's home number. Telephone number matrix 124 indicates by the numbers 5 in cells 134 and 136, which the highest valued cells in columns 138 and 140, that a call from caller 2 will go to the telephone number "555-1111" between 8:00 AM and 10:00 AM time span which will cause the telephone at the intended call recipient's home to ring. This will permit caller 2, who the intended call recipient desires to have access to his home, to attempt the call to the home telephone.

Note that the above-described feature may apply not only to an individual caller, but also to a class of callers seeking to reach the user of the present invention. For example, suppose that a user designates a range of caller identifiers as capable of accessing a set of telephone number selection matrices 10. The range of caller identifiers may be, for instance, all callers in the user's neighborhood. The telephone number selection matrices 10 may permit these callers to have access to the user in ways that other callers would not. As such, instead of only a single caller having special access, all callers in this range could have the preferential access similar to that of caller 2, above.

Although the invention has been described in detail herein with reference to the illustrative embodiments, it is to be understood that this description is by way of example only and is not to be construed in a limiting sense. For example, the following exemplary modification is well within the scope of the present invention. It is to be further understood, therefore, that numerous changes in the details of the embodiments of the invention and additional embodiments of the invention, will be apparent to, and may be made by, persons of ordinary skill in the art having reference to this description. It is contemplated that all such changes and additional embodiments are within the spirit and true scope of the invention as claimed below.

What is claimed is:

1. A method for directing an outbound telephone call originating from a caller system associated with a caller to an intended call recipient, comprising the steps of:
   (a) generating a call signal with the caller system, the call signal associated with the intended call recipient;
   (b) translating the call signal to an identifier for a predetermined set of telephone numbers associated with the intended call recipient;
   (c) selecting at least one telephone number to call from the predetermined set of telephone numbers according to at least one parameter;
   (d) placing at least one outbound telephone call with the system, the at least one outbound telephone call originating from the caller system by using the at least one telephone number to call;
   (e) determining the success of the outbound telephone call according to at least one predetermined criterion;
   (f) selecting at least one previously unselected telephone number from the predetermined set of telephone numbers in the event of each of said at least one outbound telephone calls generating an unsuccessful call; and
   (g) repeating steps (d), (e), and (f) until the first occurrence of either a successful telephone call or the condition that the predetermined set of telephone numbers contains no previously unselected telephone numbers.

2. The method of claim 1, wherein said call signal generating step further comprises the step of generating a call signal from a cellular telephone.

3. The method of claim 1, further comprising the steps of repeating steps (a) through (g) for each intended call recipient from a set comprising a plurality of predetermined intended call recipients.

4. The method of claim 1, wherein said call signal generating step comprises the step of generating a voice command associated with the intended call recipient.

5. The method of claim 1, wherein said call signal generating step comprises the step of generating said call signal using a keystroke command from a computer input device, the key stoke command associated with the intended call recipient.

6. The method of claim 1, wherein said call signal generating step comprises the step of generating said call signal using a touch tone keypad associated with a touch tone phone.

7. The method of claim 1, wherein said call signal generating step comprises the step of generating said call signal using a switch.

8. The method of claim 1, wherein said telephone number selecting step comprises the step of selecting the telephone number to call as a most likely number at which to reach the intended call recipient according to the at least one parameter.

9. The method of claim 1, wherein said previously unselected telephone number selecting step comprises the step of selecting the previously unselected telephone number as a next most likely number at which to reach the intended call recipient.

10. The method of claim 1, wherein said call signal translating step comprises the step of translating the call signal to an identifier for a predetermined set of telephone numbers associated with the intended call recipient, and further wherein the predetermined set of telephone numbers associate with the intended call recipient according to a continually changing parameter associated with the day on which said translating step occurs.

11. The method of claim 1, wherein said call signal translating step comprises the step of translating the call signal to an identifier for predetermined set of telephone numbers associated with the intended call recipient, and further wherein the predetermined set of telephone numbers associate with the intended call recipient according to a continually changing parameter associated with the date on which said translating step occurs.

12. The method of claim 1, wherein said call signal translating step comprises the step of translating the call signal to an identifier for a predetermined set of telephone numbers associated with the intended call recipient, and further wherein the predetermined set of telephone numbers associate with the intended call recipient according to a continually changing parameter associated with the time of the day on which said translating step occurs.

13. The method of claim 1, wherein said call signal translating step comprises the step of translating the call signal to an identifier for predetermined set of telephone numbers associated with the intended call recipient, and further wherein the predetermined set of telephone numbers associate with the intended call recipient according to an identification of the origin of the call signal.

14. The method of claim 1, wherein said success determining step further comprises the step of determining the duration of the call to exceed a predetermined time limit.

15. The method of claim 1, wherein said success determining step further comprises the step of determining the occurrence of a successful call response signal.

16. The method of claim 1, wherein said call placing step further comprises the step of essentially simultaneously placing a plurality of telephone calls using the plurality of telephone numbers to call from the predetermined set of telephone numbers.

17. The method of claim 1, further comprising the step of revising the predetermined set of telephone numbers according the results of steps (a) through (d).

18. The method of claim 1, further comprising the step of performing said call directing method using an independent personal computer for receiving a single call signal and directing the telephone call in response to the single call signal.

19. The method of claim 1, further comprising the steps of performing said call directing method using an independent personal computer comprising a memory device for storing the predetermined set of telephone numbers and revising the predetermined set of telephone numbers according to the results of steps (d) through (g).

20. The method of claim 1, further comprising the step of performing said call directing method using an independent personal computer comprising a memory device for storing the predetermined set of telephone numbers and revising the predetermined set of telephone numbers according to the results of steps (d) through (g), said independent personal computer associated to permit numerous callers to perform said call directing step.

21. The method of claim 1, further comprising the step of performing said call directing method using a multi-user computer network for receiving a plurality of call signals and directing the telephone call in response to at least one of the plurality of call signals.

22. The method of claim 1, further comprising the steps of performing said call directing method using a multi-user computer network associated with a memory device for storing the predetermined set of telephone numbers and revising the predetermined set of telephone numbers according the results of steps (d) through (g) for each call to the same intended call recipient from a plurality of users.

23. A system for directing an outbound telephone call from a caller associated with the system to an intended call recipient, comprising:

call signal generating means for generating a call signal associated with the intended call recipient;

translating means for translating said call signal to an identifier for predetermined set of telephone numbers associated with the intended call recipient;

telephone number selecting means for selecting at least one telephone number to call from said predetermined set of telephone numbers according to at least one parameter;

telephone call placing means for
(a) placing at least one outbound telephone calls using said at least one telephone number to call;
(b) determining the success of completing said at least one outbound telephone call according to at least one predetermined criterion;
(c) selecting at least one previously unselected telephone number from said predetermined set of telephone numbers in the event of each of said at least one outbound telephone calls generating an unsuccessful call; and
(d) repeating steps (a), (b), and (c) until the first occurrence of either a successful telephone call or the condition that said predetermined set of telephone numbers contains no previously unselected telephone numbers;

wherein the caller originates the outbound call from the system and wherein the telephone call placing means is associated with the caller.

24. The system of claim 23, wherein said call signal generating means comprises a voice recognition scheme.

25. The system of claim 23, wherein said call signal generating means comprises a keystroke command from a computer input device.

26. The system of claim 23, wherein said call signal generating means comprises a keystroke command from a touch tone keypad.

27. The system of claim 23, wherein said telephone number selecting means comprises a call management system that selects the telephone number to call as a most likely number at which to reach the intended call recipient according to the at least one parameter.

28. The system of claim 23, wherein said previously unselected telephone number selecting means comprises a call management system that selects the previously unselected telephone number as a next most likely number at which to reach the intended call recipient.

29. The system of claim 23, wherein said translating means translates said call signal to an identifier for a predetermined set of telephone numbers associated with the intended call recipient, and further wherein said predetermined set of telephone numbers associate with the intended call recipient according to a continually changing parameter associated with the day of the week on which operation of said translating means occurs.

30. The system of claim 23, wherein said translating means translates said call signal to an identifier for a predetermined set of telephone numbers associated with the intended call recipient, and further wherein said predetermined set of telephone numbers associate with the intended call recipient according to a continually changing parameter associated with the time of the day on which operation of said translating means occurs.

31. The system of claim 23, wherein said translating means translates said call signal to an identifier for a predetermined set of telephone numbers associated with the intended call recipient, and further wherein said predetermined set of telephone numbers associate with the intended call recipient according to an identification of the origin of said call signal.

32. The system of claim 23, wherein said telephone call placing means determines the success of completing an outbound telephone call according to at least one predetermined criterion comprising the duration of the call exceeding a predetermined time limit.

33. The system of claim 23, wherein said telephone call placing means determines the success of completing an outbound telephone call according to at least one predetermined criterion comprising the occurrence of a successful call response signal.

34. The system of claim 23, wherein said telephone call placing means can simultaneously place a plurality of telephone calls using the plurality of telephone numbers to call from said predetermined set of telephone numbers.

35. The system of claim 23, further comprising a call management system for revising said predetermined set of telephone numbers according the results of operations (a) through (d) of said telephone placing means.

36. The system of claim 23, wherein said translating means comprises an independent personal computer for receiving a single call signal and directing the telephone call in response to the single call signal.

37. The system of claim 23, wherein said independent personal computer comprises a memory device for storing said predetermined set of telephone numbers and revising said predetermined set of telephone numbers according the operations of portions (a) through (d) of the telephone call placing means.

38. The system of claim 23 wherein said translating means comprises a multi-user computer network for receiving a plurality of call signals and directing the telephone call in response to at least one of the plurality of call signals.

39. The system of claim 23, wherein said multi-user computer network comprises a memory device for storing said predetermined set of telephone numbers and revising said predetermined set of telephone numbers according the results of functions (a) through (d) of said telephone placing means for each call to the same intended call recipient made by a plurality of users.

* * * * *